May 3, 1927.
J. L. FAY
1,626,798
FUEL MIXING DEVICE FOR INTERNAL COMBUSTION ENGINES
Filed Sept. 14, 1922
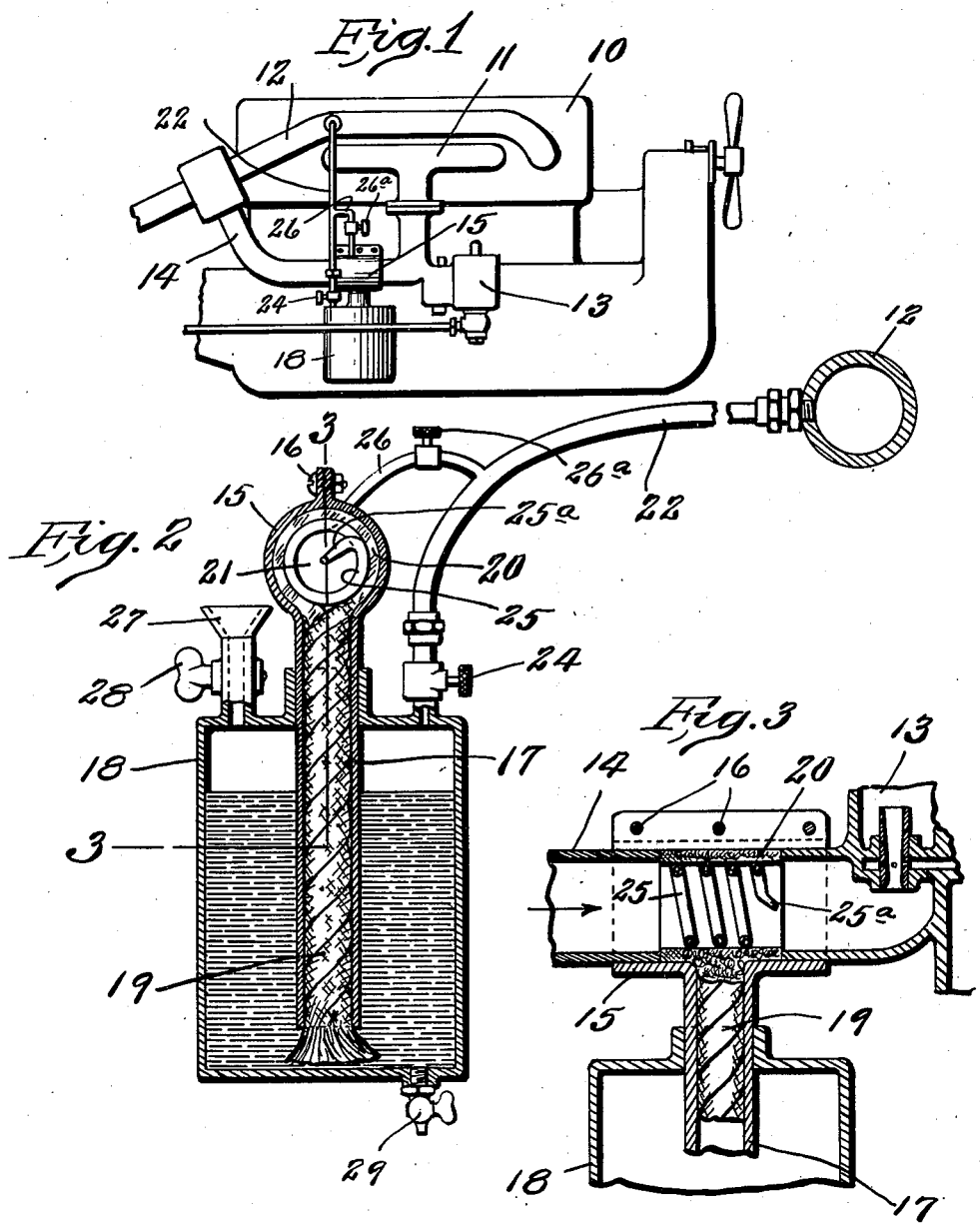
Inventor
John L. Fay
By F. R. Cornwal, atty.

Patented May 3, 1927.

1,626,798

UNITED STATES PATENT OFFICE.

JOHN L. FAY, OF ST. LOUIS, MISSOURI.

FUEL-MIXING DEVICE FOR INTERNAL-COMBUSTION ENGINES.

Application filed September 14, 1922. Serial No. 588,220.

This invention relates to devices for injecting hot exhaust gas or moisture into the primary air intake and mixing these with the combustible mixture.

The objects of the invention are to admit carbon monoxide gas contained in the exhaust gas and vapor produced by the evaporation of water and to mix these with the primary air and the atomized fuel, thereby providing a more powerful combustible mixture and increasing the efficiency of the engine and reducing the consumption of gasoline.

Other objects of the invention are to admit the exhaust gas to the primary air intake at a point adjacent to the carburetor and to form the discharge pipe and place the discharge nozzle at such an angle that the exhaust gas is delivered at a great velocity and imparts to the air in the intake and the combustible mixture in its carburetor a swirling motion so that the molecules of gasoline are further and completely broken up and more thoroughly atomized and mixed with air and the vapor and carbon monoxide gas thus providing a combustile mixture of maximum power.

Further objects of the invention are to provide simple means for increasing the humidity of the combustible mixture, thereby eliminating carbon from the combustion chambers and preventing the further formation thereof and increasing the efficiency of the electric spark due to the humidity thus produced in the combustion chambers.

Still further objects of the invention are to provide means adapted to be interposed in the intake pipe of the engine at a point between the carburetor and the air inlet, said means having an absorbent element which is maintained saturated with water, or a suitable solution, and supplies by capillary attraction the intake connection of the engine with moisture, and to provide means for applying pressure to the water supply whereby the supply of moisture to said intake is automatically increased or decreased in proportion to the speed of the engine.

With these and other objects in view, my invention consists in certain novel features of construction and arrangements of parts, hereinafter more fully described and claimed, and illustrated in the accompanying drawings, in which,—

Figure 1 is a side elevation of an internal combustion engine showing the fuel mixing device in position thereon.

Figure 2 is a vertical cross section taken on line 2—2 of Figure 1.

Figure 3 is a vertical cross section taken on line 3—3 of Figure 2.

Referring by numerals to the accompanying drawings, 10 designates an internal combustion engine having an intake connection 11, exhaust pipe 12, carburetor 13 and a primary air inlet 14, all of which are of the usual construction. A portion of the intake pipe 11 is cut away and a short tubular section 15 is interposed in said intake pipe and clamped in position by suitable fastening means 16. Depending from section 15 is a tubular section 17 the lower end of which terminates near the bottom of a closed tank 18. This tank is secured at the upper end in any suitable manner to the upper portion of tube 17. A wick 19 formed of cotton or similar material is placed in tubular portion 17, and its lower end projects out from the lower end of said tube and terminates near the bottom of tank 18, while its upper end 20 projects through the upper end of said tube. This upper end 20 is separated into two portions which are arranged against and form a lining for the inner faces of section 15, thereby forming a passageway 21 through which the air passes to the carburetor.

Wick 19 may be formed of a single piece or of strands twisted together, as shown in the drawings. Tank 18 is filled with water, or, in freezing weather, with a mixture of water and alcohol, so that wick 19 is partly submerged in water, and the upper end of said wick, which is located in section 15, is constantly maintained moist by capillary attraction. The primary air in traversing passage 21 mixes with the vapor produced by the evaporation of the water contained in the neck portions 20, thereby increasing the power of the mixture. The vapor assists in removing carbon from the combustion chamber and prevents the further formation of carbon therein.

Leading from the exhaust pipe 12 of the engine is a pipe connection 22 which is comparatively small in cross section and is connected to the upper end of tank 18. The pressure created in the exhaust pipe of the engine during the operation thereof is partially transmitted by pipe 22 to tank 18 thereby placing the water or solution contained therein under pressure so that the liquid is more rapidly supplied to the evaporating portions 20 of wick 19. The point of connection of pipe 22 to exhaust pipe 12 is preferably between the third and fourth cylinder, at which point the exhaust is at about the proper pressure.

Pipe 22 is provided with an adjustable petcock or valve 24 whereby the pressure admitted to the tank 18 may be properly regulated. In this manner, pressure in the tank increases in proportion to the speed of the engine and consequently more water is thus supplied by wick 19 to the evaporating portions 20 so that the more rapid evaporation of water caused by the higher speed of the engine is automatically compensated by the increased flow of water through wick 19 to portions 20.

Tube 19 extends downwardly into the tank and encloses the wick, so that the latter is not at any time exposed to the exhaust gas in the tank. Thus, the water pressure in the wick is maintained the same irrespective of the level of the water in the tank and furthermore the evaporation of the water contained in the wick is thereby eliminated.

In order to increase the power and combustibility of the charge, a small amount of exhaust gas is admitted into the primary air intake by means of coiled pipe 25, located in section 15, preferably against the portion 20 of wick 19. The discharging end of pipe 25 is formed with a nozzle 25ª which is restricted in cross-section in order to increase the velocity of the spent gas discharged into said air intake. The nozzle 25ª is preferably placed at an angle and pipe 25 being coiled, the effect of the discharged gas will be to impart swirling motion to the air in the intake pipe and section 15 being in close proximity to carburetor 13, the atomized gasoline will also receive swirling motion at the same time being thoroughly mixed with the air and the mixture of monoxide gas.

Coil pipe 25 is heated by the passage of the exhaust gas therethrough and by being located against portions 20, heats the same and assists in the evaporation of water.

Tank 18 is provided at its upper end with a funnel-shaped extension 27 through which said tank may be filled with liquid. A valve 28 located in said extension controls the communication therethrough.

The amount of water evaporated is in proportion to the speed of the engine, a greater amount of moisture being given out by the upper ends of wick 19 when the engine is running at a higher rate of speed, the increased evaporation being due to the increased heat and pressure created in the intake pipe by exhaust gas admitted through coiled pipe 26. Simultaneously with the increased evaporation of water in the intake pipe, pressure in tank 18 is increased by virtue of its connection 22 with the exhaust pipe of the engine and this increased pressure in tank 18 causes, by virtue of capillary attraction, a more rapid travel of water upwardly through wick 19 and the evaporating sections 20.

The small brass tubing 25 is heated by the exhaust gas and assists in the evaporation, thereby increasing the humidity of the air passing through the primary intake.

The capillary action of the wick is assisted or retarded by means of the pressure created in tank 18 by the exhaust connection 22 also warming the water to some degree. The steam created in the primary air intake by the vaporization of water contained in portions 20 comes in contact with the heated carbon both in the mixture and the combustion chambers and produces carbon monoxide which mixes with the vaporized fuel and increases the power and combustibility of the mixture.

What I claim is:—

1. A fuel mixing device for internal combustion engines comprising a coiled pipe adapted to be placed in the intake of an engine and connected to the exhaust thereof for conveying to said intake under pressure a portion of the spent gas, absorbent material in said intake adjacent to said coil pipe and means for supplying moisture to said absorbent material.

2. A fuel mixing device for internal combustion engines comprising a coiled pipe adapted to be placed in the intake of an engine for discharging therein under pressure a portion of the burned gas, and means including absorbent material placed in said intake for supplying by capillary attraction, moisture to the intake of said engine adjacent to said coiled pipe.

3. A device of the class described comprising in combination with the intake connection of an engine a tank for containing water, an absorbent member located in said tank and having one end projecting therethrough into said intake, whereby moisture is admitted by capillary attraction to said intake, and a connection between the exhaust of said engine and said tank for placing the water contained in the latter under pressure in proportion with the speed of the engine.

4. A device of the class described comprising in combination with the intake connection of an engine a tank for containing water, an absorbent member located in said tank and having one end projecting therethrough into said intake, whereby moisture is admitted by capillary attraction to said intake, and a connection between the exhaust of said engine and said tank for placing the water contained in the latter under pressure in proportion with the speed of the engine, and adjustable means in said connection for regulating the pressure in said tank.

5. A fuel humidifying device for internal combustion engines comprising a tank for containing water, an absorbent member located in said tank and having one end projecting therefrom and adapted to be placed in the intake of an engine whereby moisture is admitted by capillary attraction to said intake, and adjustable means for forcing the water in said tank under pressure to the upper end of said absorbent member, whereby the intake pipe of said engine is supplied with the proper degree of moisture.

6. In a device of the class described, a coil of pipe placed in the intake connection of an engine, absorbent material surrounding said pipe, and adapted to be saturated with suitable liquid, said coil being connected to receive the hot exhaust gas of the engine, thereby raising the temperature and promoting the evaporation of the liquid from the moist absorbent material.

7. In a device of the class described, a coil of pipe placed in the intake connection of an engine a tank filled with liquid, absorbent material arranged in said intake in close proximity to said coil and extending within the liquid in said tank, a tubular connection connected to the exhaust pipe for conveying a pulsating pressure of hot gas to said coil and to said tank for the purpose of promoting capillary action.

8. In a device of the class described, a coil of pipe adapted to be arranged in the air intake of an internal combustion engine, a water tank, absorbent material arranged around said pipe and extending into said tank, thereby being kept saturated with water by capillary attraction, a tubular connection between the exhaust pipe of the engine and said coil, whereby a portion of the hot exhaust gas heats said coil and is discharged thereby into said air intake, and pipe connection between said exhaust pipe and said tank for conveying pressure of hot gas to said tank, whereby the capillary action is accelerated by said pressure.

In testimony whereof I hereunto affix my signature this 12th day of September, 1922.

JOHN L. FAY.